United States Patent [19]
Snow et al.

[11] Patent Number: 5,805,326
[45] Date of Patent: Sep. 8, 1998

[54] OPTICAL LIMITER STRUCTURE AND METHOD

[75] Inventors: Arthur W. Snow; James S. Shirk, both of Alexandria, Va.; Filbert J. Bartoli, Jr., Upper Marlboro; James R. Lindle, Bowie, both of Md.; Michael E. Boyle, Burke, Va.; Richard G. S. Pong, Silver Spring, Md.; Steven R. Flom, Temple Hills, Md.; Joseph F. Pinto, Laurel, Md.

[73] Assignee: The United States of America as represented by the Secretary of the Navy, Washington, D.C.

[21] Appl. No.: 239,068

[22] Filed: May 6, 1994

[51] Int. Cl.$^6$ .............................. G02F 1/03; G02B 9/00; G02B 5/22

[52] U.S. Cl. .................... 359/241; 359/738; 359/885; 250/216

[58] Field of Search .................... 359/241, 738, 359/885; 250/216

[56] References Cited

U.S. PATENT DOCUMENTS

| 5,080,469 | 1/1992 | McCahon et al. | 359/241 |
| 5,172,278 | 12/1992 | Tutt | 359/885 |

OTHER PUBLICATIONS

Perry et al; "Enhanced reverse saturable absorption and optical limiting in heavy-atom-substituted phthalocyanines",Optical Lett., 19(9) pp. 625–627 English Abstract (1994) only.

*Primary Examiner*—Georgia Y. Epps
*Assistant Examiner*—Evelyn A. Lester
*Attorney, Agent, or Firm*—Thomas E. McDonnell; George A. Kap

[57] ABSTRACT

An optical limiter structure which includes a limiter material preferably dissolved in a host. The limiter material is selected from substituted and unsubstituted phthalocyanines, naphthalocyanines, porphyrins, salts of these materials and mixtures thereof, whereas the host is selected from any material which can dissolve the limiter material to at least the extent of 0.1% by weight.

18 Claims, 3 Drawing Sheets

OPTICAL LIMITER STRUCTURE AND METHOD

FIELD OF THE INVENTION

This invention pertains to an optical limiter structure and method of using and particularly to optical limiters which use materials having absorptive and refractive non-linearities.

BACKGROUND OF INVENTION

The function of an optical limiter is to limit the output intensity, energy, and/or fluence of an optical beam to some specified maximum value while maintaining high light transmission at low input intensities. Such a device provides eye and sensor protection against intense optical beams while allowing good visibility at normal illumination levels. The operation of these devices relies on a material with a large third order optical susceptibility.

The prior art optical limiters have used materials with large nonlinear refractive indices. Such limiters have been found to give high thresholds and inefficient limiting.

Linear absorbers, such as various dyes suspended in fluid media, can also give rise to a non-linear refractive index because the absorbed light is converted to heat and the ensuing temperature rise leads to a change in refractive index. This refractive index will defocus the light beam, limiting light transmission through an aperture in the device.

Carbon black suspensions have also been used in optical limiters. The heating of the carbon particles leads to plasma formation. At high input fluences, the plasma formed at the focus of the lens limits light transmission.

All of the reported limiter materials are inferior to those disclosed here. The disadvantages of the prior materials include smaller and more easily saturated non-linearities, greater susceptibility to damage, and the loss of limiting ability upon damage. In addition, most of the prior art materials lack the high solubility required for effective optical limiters with large numerical apertures.

OBJECTS AND SUMMARY OF INVENTION

It is an object of this invention to provide an optical limiter structure and method of using non-linear materials which have substantially more efficient optical limiting than the prior art materials;

Another object of this invention is an optical limiter structure and method of using with superior response, including a lower threshold, a wider dynamic range, a lower high intensity transmission, and a faster response time than the current optical limiter structures and methods of using;

It is another object of this invention to provide an optical limiter structure and method of using which have a large non-linear optical absorption, high solubility in the host, and an exceptional thermal and photochemical stability;

These and other objects of this invention are accomplished by an optical limiting structure and method of using which utilize absorptive and refractive materials selected from heavy metal phthalocyanines, naphthalocyanines, porphyrins and mixtures thereof.

DETAILED DESCRIPTION OF INVENTION

This invention pertains to a method for protecting eyes or an optically sensitive material from a light source of high intensity and to an optical limiter wherein, as the intensity of incident light increases, the intensity of light transmitted through the limiter increases up to a saturation level. Above the saturation level, the transmitted light intensity remains substantially constant even with increasing intensity of incident light. The limiting action of the optical limiters disclosed herein takes place within about 1 picosecond or less after incident light impingement.

The optical limiter disclosure herein is intended to operate for visible (about 400–700 nm) and near infrared (about 700–1200 nm) electromagnetic radiation.

The optical limiter of this invention is a passive optical protector comprising a shield formed of an absorber consisting essentially of a limiter material and a liquid host. The limiter material is either soluble in the liquid host or the liquid host is a diluent for the limiter material. When the limiter material is dissolved by the host, the concentration of the limiter material in the host exceeds 0.1% by weight, based on the weight of the host. When the host is a diluent, the concentration of the limiter material in it is at least 0.1% by weight, based on the weight of the host.

The optical limiter of this invention includes an aperture to direct certain light rays onto a first lens which focuses light to a near diffraction limiter focal spot. A thin sample of the limiter material and a host is positioned near the focus spot behind the first lens. The limiter materials disclosed herein are positioned within about 1 micron of the focus and preferably just behind the focus. The optimum distance from the lens of the sample is that distance which gives the lowest transmission at incident energies.

Light passing through the sample is then recollimated by a second lens positioned behind the sample in order to render the light rays parallel. An aperture is interposed in front of the second lens in order to stop the light rays defocussed by the sample.

Figure 1:
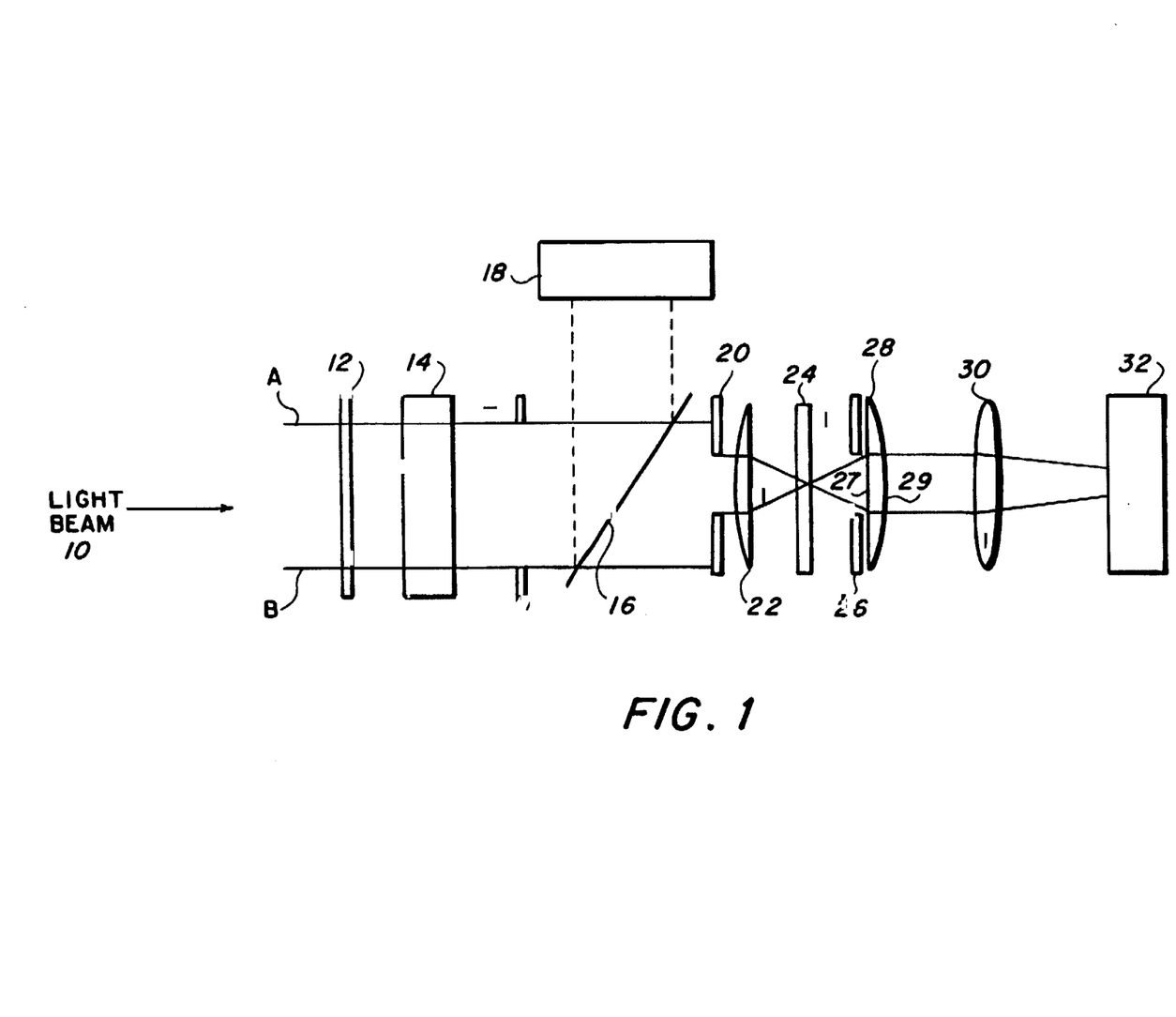
FIG. 1 schematically illustrates an optical limiter with a limiter material as the sample.

A schematic illustration of an optical limiter is shown in FIG. 1 where light beam 10 is passed through a wave plate 12 and polarizer 14 combination to control the incident light energy. Lines A and B define the extent of the light beam 10. The wave plate 12 is generally λ/2 wave plate made of either mica or quartz. Polarizer 14 is generally made of calcite. Optical glass element 16 is set at an angle to the incoming light rays and deflects some of the rays to reference detector 18 which measures the intensity of the incoming light rays. The undeflected light rays pass through optical aperture 20 which allows central portion of the light rays to impinge on the converging lens 22 which converges the light rays to a focal point. Lens 22 is designed to produce a diffraction limited focal spot. The light rays are converged in order to increase fluence thereof to promote initiation the limiting action of sample 24 at its threshold. Lens 22 is typically a corrected multiplet lens.

In accordance with the above teaching, optimum position of sample 24 from converging lens 22 is that distance which gives the lowest transmission. For samples in which nonlinearity thereof is dominated by nonlinear absorption, this position is within about 1 micron of the focus and for a limiting material with a substantial contribution from nonlinear refraction the optimum position is just behind the focal point. Aperture 26 allows rays emanating from sample 24 to impinge on lens 28 at low intensities but removes defocussed rays at a high intensity. In a particular embodiment, lens 28 can have flat surface 27 and convex surface 29. Lens 28 is vertically disposed and its flat surface 27 faces the incoming light rays. The purpose of lens 28 is to recollimate light rays and pass them to lens 30 which converges the light rays so that they impinge on detector 32, which is the detector herein protected. The detector is typically a silicon photodiode calibrated energy meter. Apertures 20 and 26 are the same and their diameters are selected to give the optical system the desired f number or numerical aperture. Typically, sample 24 is a cell about 30 microns in thickness containing a limiter material and a liquid host.

The optical limiter components are axially positioned with respect to each other so that an incoming light beam traverses each of the components in turn.

The limiter materials useful according to the present invention have large third order susceptibility ($\chi^3$), which is dependent on the wavelength of the light, and a very large figure of merit ($\chi^3/\alpha$). These limiter materials possess both refractive non-linearity and absorptive non-linearity. The nonlinear absorption is absorption which increases with light intensity. Any light absorption leads to a thermal effect which, in turn, results in expansion which changes refractive index of the limiter material thus further increasing defocusing.

Photochemical reactions take place when electrons of a limiter material at the ground level are energized to a higher, first excited energy level and then to a still higher second excited energy level in response to light of higher intensity. Upon excitation to these high energy levels, electrons are transferred to the host, resulting in reactions in the host that form opaque precipitates. The formation of these opaque precipitates imparts a fail-safe feature to the limiter material by drastically reducing its light transmission to subsequent laser pulses.

This photochemical damage to the limiter materials and hosts is unique to the invention disclosed herein. Most materials lose the absorption property and become more transmitting under high intensity light.

Suitable limiter materials herein may be solids or liquids and include heavy metal phthalocyanines, heavy metal naphthalocyanines and heavy metal porphyrins, and may be substituted or unsubstituted, but are preferably peripherally and/or axially substituted to improve dissolution thereof in the host. Salts or derivatives of these compounds may also be used to achieve the desired results. The heavy metals include lead, tin, bismuth, antimony, mercury, indium and tellurium, preferably lead and tin.

Heavy metal (M) phthalocyanines that are suitable herein include the following:

wherein substituents $R_1$ to $R_{16}$, alone or in association with each other, are selected from any substituent which enables the host to dissolve the limiter material to at least 0.1% by weight. In a preferred embodiment, substituents $R_1$ to $R_{16}$ may be hydrogen, alkyl, alkoxy, aryl, aryloxy, alkyphenoxy, phenylalkoxy, amino, alkylamino, arylamino, aminoalkyl, aminoaryl, halogen, sulfur analogs of the above substituents or mixtures thereof. The alkyl groups in these substituents contain 1–50, preferably 1–20 carbon atoms. $R_1$ to $R_{16}$ may be the same as, or different from, each other.

The substituted phthalocyanines can have substitution at a (alpha) and/or β (beta) positions. The α substituents are $R_3$, $R_4$, $R_7$, $R_8$, $R_{11}$, $R_{12}$, $R_{15}$, $R_{16}$; and β substituents are $R_1$, $R_2$, $R_5$, $R_6$, $R_9$, $R_{10}$, $R_{13}$, $R_{14}$. At least one α position and/or at least one β position on each of the four benzo rings can be substituted and one or more of the substituents can be present on any one or more of the four benzo rings. Since substitution of the phthalocyanine molecule at the peripheral β positions is more synthetically accessible than at the corresponding a positions, in a more preferred embodiment, suitable phthalocyanines have one of the above-mentioned substituents on the β position of each of the four benzo rings. Also, in a more synthetically accessible embodiment, suitable phthalocyanines also have two of the above-mentioned substituents on the α positions of each of the four rings. Especially preferred substituents at one of the β positions of the four benzo rings of the phthalocyanines are selected from the group consisting of cumylphenoxy, octadecyloxy, neopentoxy, and p-methoxythiophenoxy group. Also especially preferred peripheral substituents at two of the α positions of the four benzo rings are selected from the group consisting of butoxy and cumylphenoxy groups.

Heavy metal (M) naphthalocyanines that are suitable herein include the following:

wherein substituents $R_{17}$ to $R_{40}$, alone or in association with each other, are selected from any substituent which enables the host to dissolve the limiter material to at least 0.1% by weight. In a preferred embodiment, substituents $R_{17}$ to $R_{40}$ may be hydrogen, alkyl, alkoxy, aryl, aryloxy, alkyphenoxy, phenylalkoxy, amino, alkylamino, arylamino, aminoalkyl, aminoaryl, halogen, sulfur analogs of the above or mixtures thereof. The alkyl groups in these substituents contain 1–50, preferably 1–20 carbon atoms. $R_{17}$ to $R_{40}$ may be same as, or different from, each other.

In a more synthetically accessible embodiment, the substituted naphthalocyanines have substituents at the a positions (designated by $R_{21}$, $R_{22}$, $R_{27}$, $R_{28}$, $R_{33}$, $R_{34}$, $R_{39}$, $R_{40}$) selected from the above substituents. In especially preferred embodiment, the substituted naphthalocyanines also have two substituents at the a position on each of the four naphthalo rings which are pentoxy groups.

Heavy metal (M) porphyrins that are suitable herein include the following:

wherein substituents $R_{41}$ to $R_{52}$, alone or in association with each other, are selected from any substituent which enables the host to dissolve the limiter material to at least 0.1% by weight. In a preferred embodiment, substituents $R_{41}$ to $R_{52}$ may be hydrogen, alkyl, alkoxy, aryl, aryloxy, alkyphenoxy, phenylalkoxy, amino, alkylamino, arylamino, aminoalkyl, aminoaryl, halogen, sulfur analogs of the above substituents or mixtures thereof. The alkyl groups in these substituents contain 1–50, preferably 1–20 carbon atoms. $R_{41}$ to $R_{52}$ may be the same as, or different from, each other.

The substituted porphyrins can have substitution at meso positions and/or at pyrrol or non-meso positions. The meso substituents are $R_{41}$, $R_{42}$, $R_{43}$, $R_{44}$; the pyrrol or non-meso substituents are $R_{45}$, $R_{46}$, $R_{47}$, $R_{48}$, $R_{49}$, $R_{50}$, $R_{51}$, $R_{52}$.

In a more preferred embodiment, the substituted porphyrins have the above-listed substituents at the meso or the non-meso positions. In especially preferred embodiment, the substituted porphyrins also have one phenyl substituent on each of the four meso positions. Also in especially preferred embodiment, the substituted porphyrins also have one ethyl substituent on each of the eight non-meso positions.

The liquid or glassy host dissolves or dilutes the limiter material to an extent which can be affected by the substitution of the limiter material since it is known that substituents on a limiter material can improve dissolution thereof. Suitable hosts include any liquid or glassy polymers which can dissolve or dilute limiter materials to the extent of at least 0.1% by weight and which are safe, compatible and cost effective. Suitable hosts include liquid hosts and glassy organic polymer hosts in solid state. The liquid hosts can dissolve the limiter material to the extent of at least 0.1% by weight. Preferred examples of liquid hosts include chloroform, toluene, chlorobenzene and tetrahydrofuran. The glassy organic polymer hosts contain at least 0.1% by weight of the limiter material distributed therethrough. Preferred examples of glassy organic polymer hosts include polystyrene and poly(methyl methacrylate).

The response time of the optical limiters of this invention is 1 picosecond (ps) or less whereas in the prior art, the best response time is about 10 nanoseconds (ns). The limiters of this invention are thus effective against Q-switched lasers which have pulses of 5–10 ns and mode locked lasers with pulse widths of less than 100 ps. The threshold of the limiters of the present invention is about 5 nJ whereas that of the prior art limiters is greater than 100 nJ. The operating range of the limiters of this invention is 5–30,000 nJ whereas that of the prior art limiters is 100–10,000 nJ. Finally, the limiters of this invention are characterized by a fail-safe feature because, when the sample of the limiter of this invention is damaged, as by exposure to light having energy in excess of about 30,000 nJ, the transmission of the sample drops since the sample becomes opaque or dark. If a prior art limiter is similarly destroyed, it permits the light from subsequent laser pulses through.

The method for reducing the fluence, intensity and/or energy of light coming from a source of high intensity light comprises the steps of focussing the light through a limiter sample containing a limiter material disposed in a host whereby the high energy of the light is absorbed and defocussed by the limiter. The invention herein also can be defined as a method for protecting an optically sensitive material, such as an eye or an optical detector, from light of a high intensity comprising the steps of placing a limiter device of this invention between the light of high intensity and the optically sensitive material, the limiter sample containing heavy metal limiter material selected from phthalocyanines, naphthalocyanines, porphyrins and mixtures thereof disposed in a host.

The invention having been generally described, the following example is given as a particular embodiment of the invention to demonstrate the practice and advantages thereof. It is understood that the example is given by way of illustration and is not intended to limit the specification or the claims that follow, in any manner.

EXAMPLE

This example demonstrates use of lead tetrakis (cumylphenoxy) phthalocyanine limiter material in chloroform host as the optical limiter sample in the optical limiter structure of FIG. 1. This example also demonstrates suitability of lead naphthalocyanine and lead tetraphenylporphyrin for use as limiter materials of this invention.

The optical sample cell was 30 microns in thickness and had low intensity transmission of 68%. The aperture diameters of both apertures were adjusted to give f/5 optics and the limiter sample cell was placed within 1 micron of the focus of lens 22.

To determine the response function of the limiter, a laser pulse at 532 nm was injected into the limiter structure of FIG. 1 at 10 and entered the focusing lens 22. The focal length of the focusing lens 22 was 20 mm. The laser was operated at a repetition rate of 10 Hz (10 pulses per second) and at less than 0.3 Hz. The latter rate precludes contributions from thermal effects persisting from pulse to pulse. To simulate a beam from a distant source, a plane wave with an intensity variation of less than 15% passed through the entrance aperture 20.

Figure 2:
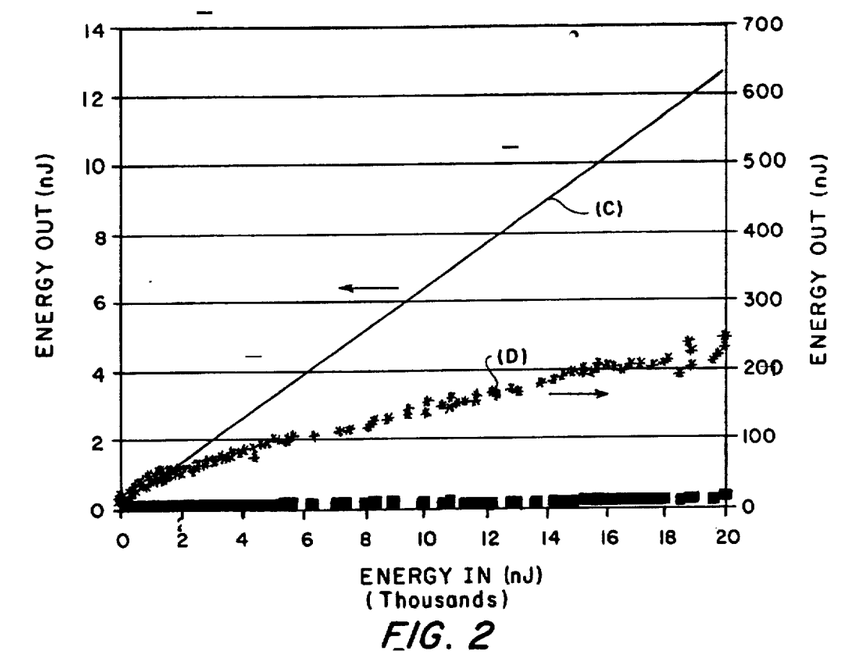
FIG. 2 is a graph of Energy out vs. Energy In for a material that has no optical limiting property, represented by line (C), and that for lead tetrakis (cumylphenoxy) phthalocyanine of this invention, represented by line (D)

FIG. 2 shows the transmitted energy as a function of the energy incident on the focusing lens 22 for lead tetrakis (cumylphenoxy) phthalocyanine in chloroform, the optical limiter sample of this invention. The lead tetrakis (cumylphenoxy) phthalocyanine dissolved in chloroform begins limiting at a few nJ, as shown in FIG. 2, however, the threshold for limiting, defined as the incident energy for which the transmission of the limiter is one-half the low intensity transmission, is $8 \pm 2$ nJ which corresponds to a peak energy density at the focus of 0.07 J/cm$^2$, calculated for laser light wavelength of 532 nm at 8 ns laser pulses. The focal volume at the focus point for lens 22 was about $3 \times 10^{-10}$ cm$^3$ for f/5 optics. The output energy was limited to less than 70 nJ (which is safe for eyes) for incident energies of up to 3000 nJ. FIG. 2 shows limiting up to an incident energy of 20,000 nJ. The output energy was limited to below 250 nJ for incident energies of up to 30,000 nJ. The limiter continued to limit up to energies where the sample windows were damaged at about 50,000 nJ.

The operation of a comparable prior art thermal limiter had threshold of about 120 nJ or a factor of about 15 higher than the limiter of this invention containing lead tetrakis (cumylphenoxy) phthalocyanine dissolved in chloroform.

At higher incident energies of about 3500 nJ, the transmitted energy was found to decrease with successive laser pulses at the same energy. Subsequent microscopic examination showed that a precipitate had formed where the laser was focused. Light scattering from the precipitate gives better limiting of subsequent laser pulses. The formation of scattering centers by the precipitate is ascribed to electron transfer to and subsequent reaction of the host chloroform.

The lead tetrakis (cumylphenoxy) phthalocyanine solutions in chloroform showed the requisite stability under normal illumination. No changes were observed in the visible spectrum over several months under normal room illumination or more than several thousand of laser pulses, except for a photochemical reaction at high fluences noted above.

Figure 3:
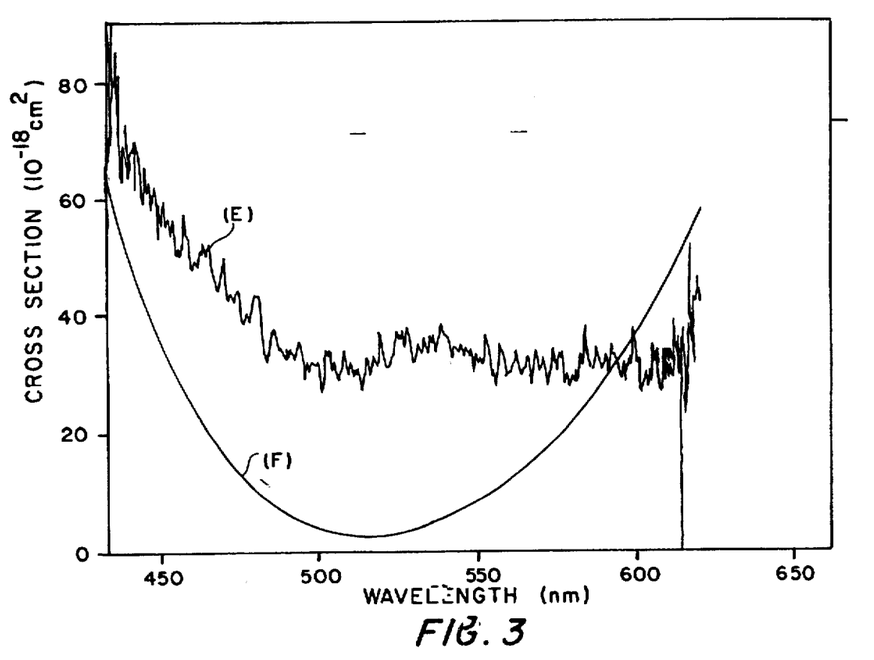
FIG. 3 is a graph of the absorption Cross Section against Wavelength for lead tetrakis (cumylphenoxy) phthalocyanine wherein curve (E) is the excited state absorption spectra and curve (F) is the ground absorption spectra.

Transient absorption techniques are an accurate, efficient, experimental method to determine the cross sections and hence the wavelength range over which efficient optical limiting will occur. The cross sections, determined from transient absorption spectra, are shown in FIG. 3 for lead tetrakis (cumylphenoxy) phthalocyanine. As FIG. 3 shows, this material is a effective limiter from 4t 4 nm to 580 nm. Additional studies show that this material has large nonlinear absorption coefficient in the near IR as well.

Figure 4:
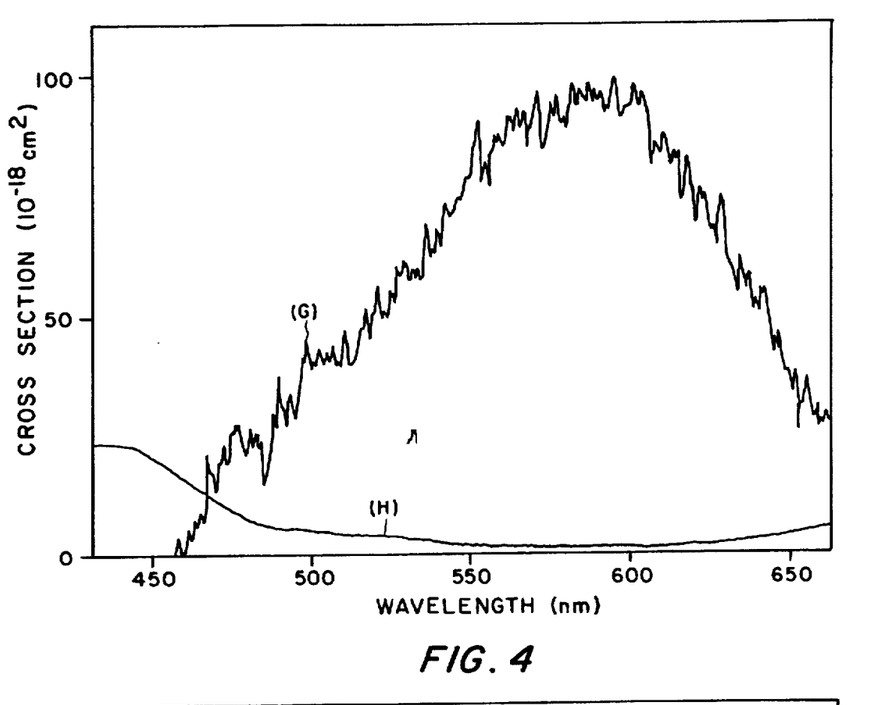
FIG. 4 is a graph of the absorption Cross Section vs. Wavelength for unsubstituted lead naphthalocyanine wherein curve (G) is the excited state absorption spectra and curve (H) is the ground state absorption spectra.

FIG. 4 is the ground absorption spectra and absorption cross sections (molar extinction coefficients) of the first excited state of unsubstituted lead naphthalocyanine dissolved in N-methylpyrrolidone. The large upper state absorption is an indication that lead naphthalocyanine is a limiter material in the wavelength range of about 500 nm to in excess of 660 nm.

Figure 5:
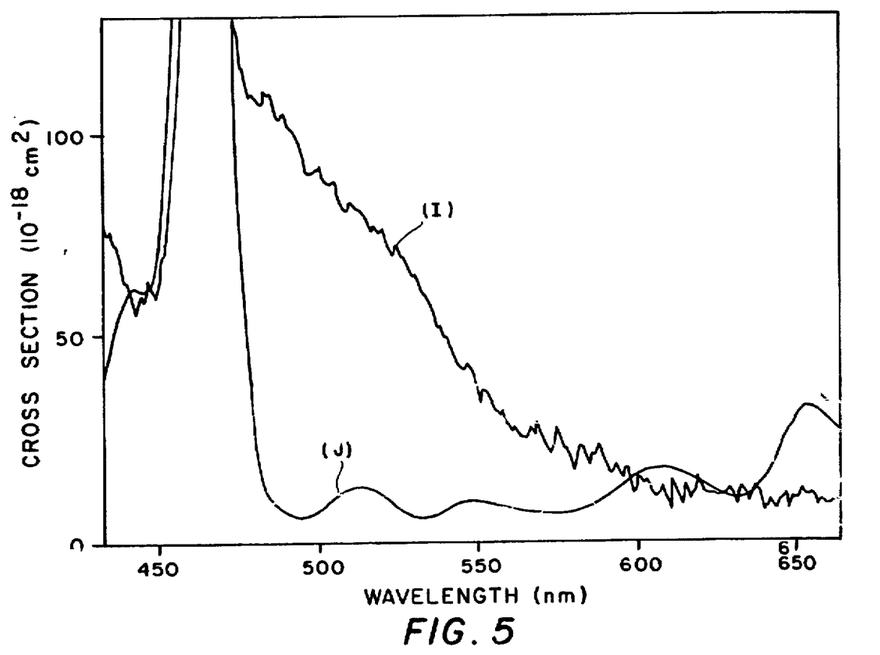
FIG. 5 is a graph of the absorption Cross Section vs. Wavelength for lead tetraphenylporphyrin wherein curve (I) is the excited state absorption spectra and curve (J) is the ground state absorption spectra.

FIG. 5 is the ground absorption spectra and absorption cross sections (molar extinction coefficients) of the first excited state of lead tetraphenylporphyrin dissolved in tetrahydrofuran. The four phenyl groups were located on the four meso positions of this porphyrin. The larger upper state absorption indicates that lead tetraphenylporphyrin is a useful limiter material near 500 nm.

The spectra of lead naphthalocyanine and lead tetraphenylporphyrin when compared to lead tetrakis (cumyphenoxy) phthalocyanine, show that the transparent regions can be altered dramatically by chemical substitution.

Many modifications and variations of the present invention are possible in light of the above teachings. It is, therefore, to be understood that within the scope of the appended claims, the invention may be practiced otherwise than as specifically described herein.

What is claimed is:

1. An optical limiter comprising a lens for focusing light to a focal point; a cell disposed at about the focal point of said focusing lens; a heavy metal limiter material and a host therefor contained in said cell; and an aft aperture disposed in back of said cell for stopping light refracted by nonlinear refraction in said limiter material wherein said limiter material is selected from the group consisting of substituted and unsubstituted heavy metal phthalocyanines, heavy metal naphthalocyanines, heavy metal porphyrins, salts of any of the above, and mixtures thereof; and wherein the heavy metal (M) is selected from the group consisting of lead, tin, bismuth, antimony, mercury, indium, tellurium, and mixtures thereof.

2. The limiter of claim 1 wherein the phthalocyanines include the following:

wherein substituents $R_1$ to $R_{16}$ are independently selected from the group consisting of hydrogen, alkyl, alkoxy, aryl, aryloxy, alkyphenoxy, phenylalkoxy, amino, alkylamino, arylamino, aminoalkyl, aminoaryl, halogen, these substituents wherein one or more oxygens is replaced by sulfur, and mixtures thereof, wherein the alkyl groups in these substituents contain 1–20 carbon atoms; wherein the naphthalocyanines include the following:

wherein substituents $R_{17}$ to $R_{40}$ are idependently selected from a group consisting of hydrogen, alkyl, alkoxy, aryl, aryloxy, alkyphenoxy, phenylalkoxy, amino, alkylamino, arylamino, aminoalkyl, aminoaryl, halogen, these substituents wherein one or more oxygens is replaced by sulfur, and mixtures thereof, wherein the alkyl groups in these substituents contain 1–20 carbon atoms; and wherein the porphyrins include the following:

wherein substituents $R_{41}$ to $R_{52}$ are independently selected from the group consisting of hydrogen, alkyl, alkoxy, aryl, aryloxy, alkyphenoxy, phenylalkoxy, amino, alkylamino, arylamino, aminoalkyl, aminoaryl, halogen, these substituents wherein one or more oxygens is replaced by sulfur, and mixtures thereof, wherein the alkyl groups in these substituents contain 1–20 carbon atoms.

3. The limiter of claim 2 wherein said host is selected from a group consisting of hosts in liquid state having dissolved therein the limiter material to at least the extent of 0.1% by weight.

4. The limiter of claim 3 wherein the phthalocyanines have one of the substituents on one of the two positions of $R_1$, $R_2$, $R_5$, $R_6$, $R_9$, $R_{10}$, $R_{13}$, $R_{14}$ on each of the four benzo rings or two of the substituents on positions of $R_1$, $R_2$, $R_5$, $R_6$, $R_9$, $R_{10}$, $R_{13}$, $R_{14}$ on each of the four benzo rings; the naphthalocyanines have two of the substituents on the positions $R_{21}$, $R_{22}$, $R_{27}$, $R_{28}$, $R_{33}$, $R_{34}$, $R_{39}$, $R_{40}$; and the porphyrins have one of the substituents on each of the substituent positions $R_{41}$ to $R_{52}$.

5. The limiter of claim 4 further including a fore aperture for directing a band of incoming light therethrough; a lens for recollimating light emanating from said cell; wherein the heavy metal is selected from the group consisting of lead, tin, and mixtures thereof; and a detector for detecting light emanating from said aft aperture; said limiter having response time of 1 ps or less, a threshold of about 5 nJ, a dynamic range of about 5–30,000 nJ, and a self-protecting feature.

6. The limiter of claim 5 wherein the phthalocyanines have at least one substituent selected from cumylphenoxy, octadecyloxy, neopentoxy, n-butoxy, and p-methoxythiophenoxy groups; the naphthalocyanines have pentoxy substituent groups; and the porphyrins have at least one substituent selected from phenyl and ethyl groups.

7. The limiter of claim 6 wherein the host is selected from a group consisting of chloroform, toluene, chlorobenzene, tetrahydrofuran and mixtures thereof.

8. The limiter of claim 2 wherein the host is selected from a group consisting of hosts in liquid state having dissolved therein the limiter material to at least the extent of 0.1% by weight, glassy polymeric hosts in solid state containing at least 0.1% by weight of the limiter material distributed throughout, and mixtures thereof.

9. The limiter of claim 3 wherein the phthalocyanines have at least one of the substituents on at least one of the positions $R_1$ to $R_{16}$; the naphthalocyanines have at least one of the substituents on at least one of the positions $R_{21}$, $R_{22}$, $R_{27}$, $R_{28}$, $R_{33}$, $R_{34}$, $R_{39}$, $R_{40}$; and the porphyrins have at least one of the substituents on at least one of the positions $R_{41}$ to $R_{52}$.

10. A method for reducing the intensity of a light beam of high intensity comprising the steps of passing light of high intensity through a cell containing a limiter material and a host for the limiter material whereby intensity of the light of high intensity is reduced and detecting light of reduced intensity coming from the cell wherein the limiter material is selected from the group consisting of substituted and unsubstituted heavy metal phthalocyanines, heavy metal naphthalocyanines, heavy metal porphyrins, salts of any of the above, and mixtures thereof; and wherein the heavy metal is selected from the group consisting of lead, tin, bismuth, antimony, mercury, indium, tellurium, and mixtures thereof.

11. The method of claim 10 wherein the phthalocyanines include the following:

wherein substituents $R_1$ to $R_{16}$ are independently selected from the group consisting of hydrogen, alkyl, alkoxy, aryl, aryloxy, alkyphenoxy, phenylalkoxy, amino, alkylamino, arylamino, aminoalkyl, aminoaryl, halogen, these substituents wherein one or more oxygens is replaced by sulfur, and mixtures thereof, wherein the alkyl groups in these substituents contain 1–50 carbon atoms; wherein the naphthalocyanines include the following:

wherein substituents $R_{17}$ to $R_{40}$ are indepefndently selected from the group consisting of hydrogen, alkyl, alkoxy, aryl, aryloxy, alkyphenoxy, phenylalkoxy, amino, alkylamino, arylamino, aminoalkyl, aminoaryl, halogen, these substituents wherein one or more oxygens is replaced by sulfur, and mixtures thereof, wherein the alkyl groups in these substituents contain 1–50 carbon atoms; and wherein the porphyrins include the following:

wherein substituents $R_{41}$ to $R_{52}$ are independently selected from a group consisting of hydrogen, alkyl, alkoxy, aryl, aryloxy, alkyphenoxy, phenylalkoxy, alkylamino, arylamino, aminoalkyl, aminoaryl, amino, halogen, these substituents wherein one or more oxygens is replaced by sulfur, and mixtures thereof, wherein the alkyl groups in these substituents contain 1–50 carbon atoms.

12. The method of claim 11 wherein the host is selected from group consisting of hosts in liquid state having dissolved therein the limiter material to at least the extent of 0.1% by weight, glassy polymeric hosts in solid state containing at least 0.1% by weight of the limiter material distributed throughout, and mixtures thereof.

13. The method of claim 12 wherein the phthalocyanines have at least one of the substituents on at least one position of $R_1$ to $R_{16}$; naphthalocyanines have at least one of the substituents on at least one of the positions $R_{21}$, $R_{22}$, $R_{27}$, $R_{28}$, $R_{33}$, $R_{34}$, $R_{39}$, $R_{40}$; and the porphyrins have at least one of the substituents on at least one of the positions $R_{41}$ to $R_{52}$.

14. The method of claim 11 wherein the phthalocyanines have one of the substituents on the two positions of $R_1$, $R_2$, $R_5$, $R_6$, $R_9$, $R_{10}$, $R_{13}$, $R_{14}$ on at least one of the four benzo rings or two of the substituents on the two positions of $R_1$, $R_2$, $R_5$, $R_6$, $R_9$, $R_{10}$, $R_{13}$, $R_{14}$ on at least one of the four benzo rings; the naphthalocyanines have two of the substituents on two positions of $R_{21}$, $R_{22}$, $R_{27}$, $R_{28}$, $R_{33}$, $R_{34}$, $R_{39}$, $R_{40}$ on at least one of the four naphthalo rings; and the porphyrins have at least one of the substituents on at least one of the positions of $R_{41}$ to $R_{52}$.

15. The method of claims 14 wherein the host is in a liquid state.

16. The method of claim 15 wherein the phthalocyanines have one of the substituents on one of the positions of $R_1$, $R_2$, $R_5$, $R_6$, $R_9$, $R_{10}$, $R_{13}$, $R_{14}$ on each of the four benzo rings or two of the substituents on positions of $R_1$, $R_2$, $R_5$, $R_6$, $R_9$, $R_{10}$, $R_{13}$, $R_{14}$ on each of the four benzo rings; the naphthalocyanines have two of the substituents on positions of $R_{21}$, $R_{22}$, $R_{27}$, $R_{28}$, $R_{33}$, $R_{34}$, $R_{39}$, $R_{40}$ on each of the four naphtho rings; and the porphyrins have one of the substituents on positions $R_{41}$ to $R_{52}$.

17. The method of claim 16 wherein the phthalocyanines have at least one substituent selected from the group consisting of cumylphenoxy, octadecyloxy, neopentoxy, n-butoxy, and p-methoxythiophenoxy groups; the naphthalocyanines have pentoxy substituent groups; and the porphyrins have at least one substituent selected from a group consisting of phenyl and ethyl groups.

18. The method of claim 17 wherein the host is selected from a group consisting of chloroform, toluene, chlorobenzene, tetrahydrofuran and mixtures thereof.

* * * * *